(12) United States Patent
Bhatnagar et al.

(10) Patent No.: US 11,474,913 B2
(45) Date of Patent: Oct. 18, 2022

(54) RESTORATION OF SNAPSHOTS FROM CLOUD USING DIFFERENTIAL SNAPSHOT MECHANISM

(71) Applicant: EMC IP Holding Company LLC, Hopkinton, MA (US)

(72) Inventors: Anurag Bhatnagar, Bangalore (IN); Sarat Kumar Behera, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 32 days.

(21) Appl. No.: 17/073,901

(22) Filed: Oct. 19, 2020

(65) Prior Publication Data
US 2022/0121535 A1   Apr. 21, 2022

(51) Int. Cl.
*G06F 16/00* (2019.01)
*G06F 11/14* (2006.01)
*G06F 16/11* (2019.01)

(52) U.S. Cl.
CPC ...... *G06F 11/1469* (2013.01); *G06F 11/1435* (2013.01); *G06F 11/1451* (2013.01); *G06F 11/1471* (2013.01); *G06F 16/128* (2019.01); *G06F 2201/84* (2013.01)

(58) Field of Classification Search
CPC .......... G06F 11/1469; G06F 11/1435; G06F 11/1451; G06F 11/1471; G06F 16/128; G06F 2201/84
See application file for complete search history.

(56) References Cited

U.S. PATENT DOCUMENTS

| | | | |
|---|---|---|---|
| 9,563,517 B1* | 2/2017 | Natanzon | G06F 11/1451 |
| 9,679,040 B1* | 6/2017 | Davis | G06F 16/275 |
| 2015/0363282 A1* | 12/2015 | Rangasamy | G06F 11/00 714/4.12 |
| 2015/0378847 A1* | 12/2015 | Tarasuk-Levin | G06F 11/2023 714/19 |
| 2018/0356989 A1* | 12/2018 | Meister | G06F 11/3409 |

(Continued)

OTHER PUBLICATIONS

Dell EMC, "Dell EMC Unity: Cloud Tiering Applicance (CTA)," Dell EMC White Paper, Mar. 2019, 32 pages.
(Continued)

*Primary Examiner* — Shiow-Jy Fan
(74) *Attorney, Agent, or Firm* — Ryan, Mason & Lewis, LLP

(57) ABSTRACT

A method comprises receiving a request to restore a given snapshot of a plurality of snapshots from a cloud storage platform to a storage array. In the method, a first metadata file corresponding to the given snapshot is downloaded from the cloud storage platform, and data corresponding to the given snapshot is written to the storage array. An additional metadata file corresponding to a previous snapshot of the plurality of snapshots with respect to the given snapshot is downloaded. The first metadata file and the additional metadata file are compared to determine whether one or more offsets in the additional metadata file are present in the first metadata file. Data corresponding to any of the one or more offsets determined to be absent from the first metadata file is written to the storage array, and the one or more absent offsets are added to the first metadata file.

20 Claims, 8 Drawing Sheets

(56) References Cited

U.S. PATENT DOCUMENTS

2019/0129810 A1* 5/2019 Kushwah .............. G06F 16/125

OTHER PUBLICATIONS

Net App, "Overview of Snapshot Storage," https://mysupport.netapp.com/NOW/public/eseries/sam_archive1150/index.html#page/GUID-8538272A-B802-49D9-9EA2-96C82DAD26A2/GUID-0947EC47-B807-4206-BBBE-3B46505E4DA7.html, Accessed Oct. 19, 2020, 1 page.
Wikipedia, "Offset (computer science)" https://en.wikipedia.org/w/index.php?title=Offset_(computer_science)&oldid=951535172, Apr. 17, 2020, 1 page.
M. Rouse, "Storage Snapshot," WhatIs.com, https://searchdatabackup.techtarget.com/definition/storage-snapshot, Oct. 18, 2016, 5 pages.

* cited by examiner

405

[Without Compression]

Array     Cloud
0:8192    0:8192
8192:8192    8192:8192
16384:8192    16384:8192
24576:8192    24576:8192

410

[With Compression]

Array     Cloud
0:8192    0:4096
8192:8192    4096:4096
16384:8192    8192:4096
24576:8192    12288:4096

Offset:Length:Cloud_Offset:Cloud_Length:Compression_Type:Encryption_Enabled

RESTORATION OF SNAPSHOTS FROM CLOUD USING DIFFERENTIAL SNAPSHOT MECHANISM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to restoring snapshots using a differential cloud snapshot mechanism.

BACKGROUND

A snapshot is a representation of a state of a system at a particular point in time. For example, storage snapshots can include blocks of data at certain points in time. Snapshots typically provide data protection so that when information is lost due to some failure event, the snapshots provide accessible copies of the data, which allow the data to be restored to a specific point in time if a failure occurs. Snapshots may be stored in chronological order, based on their timestamps.

Users archive data based on one or more policies. For example, data can be moved between storage arrays and one or more cloud storage platforms. Snapshots on a storage array can be transmitted to cloud object storage based on user defined policies. An originating storage array has access to these cloud snapshots, and has the ability to restore any of the snapshots from the cloud storage platform back to a local or remote platform volume of the storage array through a restore mechanism. Existing restore solutions require large amounts of time and processing power to restore the snapshots.

SUMMARY

Illustrative embodiments provide techniques for restoring cloud snapshots using a differential cloud snapshot mechanism, which makes restoration more efficient and less time consuming. For example, in one or more embodiments, a cloud tiering appliance (CTA) restores snapshots starting with snapshots occurring later in time, searches for existing offsets and writes data from offsets not found to exist.

In one embodiment, a method comprises receiving a request to restore a given snapshot of a plurality of snapshots from a cloud storage platform to a storage array. In the method, a first metadata file corresponding to the given snapshot is downloaded from the cloud storage platform, and data corresponding to the given snapshot is written to the storage array. An additional metadata file corresponding to a previous snapshot of the plurality of snapshots with respect to the given snapshot is downloaded. The first metadata file and the additional metadata file are compared to determine whether one or more offsets in the additional metadata file are present in the first metadata file. Data corresponding to any of the one or more offsets determined to be absent from the first metadata file is written to the storage array, and the one or more offsets determined to be absent from the first metadata file are added to the first metadata file.

These and other illustrative embodiments include, without limitation, methods, apparatus, networks, systems and processor-readable storage media.

BRIEF DESCRIPTION OF THE DRAWINGS

FIG. 4 depicts offsets in a storage array and in cloud storage with and without compression according to an illustrative embodiment.

FIG. 5 depicts a sample metadata file with offsets according to an illustrative embodiment.

DETAILED DESCRIPTION

Figure 1:
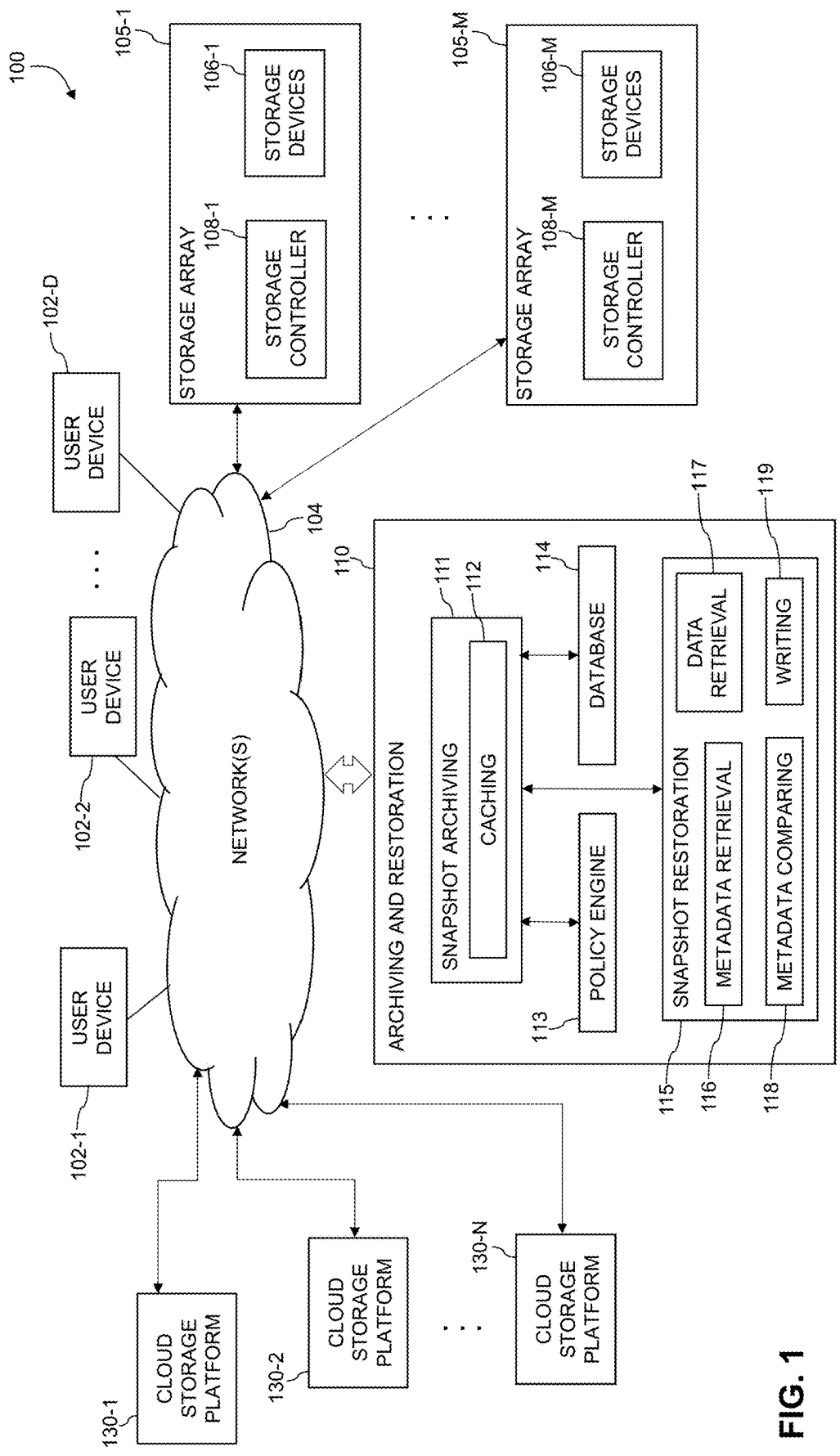
FIG. 1 depicts details of an information processing system with an archiving and restoration platform for archiving and restoring snapshots between array and cloud storage according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

In illustrative embodiments, snapshots on a storage array are transmitted to cloud object storage based on user defined policies via, for example, an archiving and restoration platform. The archiving and restoration platform may comprise, for example, a CTA. These snapshots are transmitted based on a differential snapshot (also referred to herein as "snapdiff") received from the storage array. The differential snapshot includes information about offsets changed between the snapshots. The archiving and restoration platform begins with a base snapshot and transmits its own metadata along with compressed and encrypted data to a cloud storage platform, followed by delta snapshots based on policy. The originating storage array has access to the cloud snapshots through the archiving and restoration platform. A restoration component of the archiving and restoration platform restores snapshots from the cloud storage platform back to a local or remote platform volume of the storage array.

Current restoration solutions restore snapshots in a serial order, starting from snap base, snap_1, snap_2, . . . snap_n, requiring an enormous amount of time to restore the snapshots to "snap_n." Advantageously, in illustrative embodiments, when restoring of snap_n is initiated, an archiving and restoration platform (e.g., CTA) will commence restoration starting with the snapshot which is being restored, and going in reverse chronological order to the base snapshot (i.e., snap_n, . . . , snap_2, snap_1, snap base). The archiving and restoration platform will download a metadata file corresponding to snap_n and restore all data for snap_n from cloud storage to the storage array. The metadata for snap_n is designated as master metadata. Then the archiving and restoration platform will download the metadata file corresponding to snap_n−1 and instead of restoring all data for snap_n−1 from cloud storage to the storage array, snap_n−1 metadata is compared with the master metadata. Based on the comparison, if an offset found in the snap_n−1 metadata already exists in the master metadata, the archiving and restoration platform will determine that there is no need to write the data pertaining to that offset again from cloud storage to the storage array, and that offset is dropped. If an offset found in the snap_n−1 metadata does not exist in the master metadata, the data pertaining to that offset is written from cloud storage to the storage array, and the offset that did not exist in the master metadata is appended to the master metadata.

As used herein, an "offset" is to be broadly construed and refers to, for example, an indication of location of data within an array or other data structure. An offset can be relative to another location, and may indicate a distance between a first location (e.g., the beginning of an object) and a location of a given element or point (e.g., for the same object). An offset can be expressed in, for example, bytes or words. For example, referring to FIG. 4, offsets and data block sizes for cloud and array storage are shown in tables 405 and 410. In table 405, for example, there is no compression of data from an array when the data is stored on a cloud storage platform and, thus, no difference between offsets and data block sizes between array and cloud storage. More specifically, in the table 405, the offsets are 0, 8192, 16384 and 24576 bytes for data blocks of 8192 bytes. In table 410, since there is compression of data from an array when the data is stored on a cloud storage platform, there are differences between offsets and data block sizes from array to cloud storage. In more detail, the offsets and data sizes for the storage array in table 410 are the same as those in table 405. Assuming there is compression by a factor of 2 for cloud storage in table 410, the offsets are 0, 4096, 8192 and 12288 bytes for data blocks of 4096 bytes.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with an archiving and restoration platform 110. A non-limiting example of an archiving and restoration platform 110 comprises a CTA, but the embodiments are not necessarily limited thereto. The user devices 102 may also communicate over the network 104 with a plurality of storage arrays 105-1, . . . 105-M, collectively referred to herein as storage arrays 105. The storage arrays 105 comprise respective sets of storage devices 106-1, . . . 106-M, collectively referred to herein as storage devices 106, coupled to respective storage controllers 108-1, . . . 108-M, collectively referred to herein as storage controllers 108.

The user devices 102 can comprise, for example, Internet of Things (IoT) devices, desktop, laptop or tablet computers, mobile telephones, or other types of processing devices capable of communicating with the archiving and restoration platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, M, N and P are assumed to be arbitrary positive integers greater than or equal to two.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the archiving and restoration platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the archiving and restoration platform 110, as well as to support communication between the archiving and restoration platform 110 and connected devices (e.g., user devices 102) and/or other related systems and devices not explicitly shown.

Users may refer to customers, clients and/or administrators of computing environments for which archiving and restoration are being performed. For example, in some embodiments, the user devices 102 are assumed to be associated with repair technicians, system administrators, information technology (IT) managers, software developers release management personnel or other authorized personnel configured to access and utilize the archiving and restoration platform 110.

The archiving and restoration platform 110 of the system 100 is configured to move data between the storage arrays 105 and one or more cloud storage platforms 130-1, 130-2, ... 130-N, collectively referred to herein as cloud storage platforms 130. The archiving and restoration platform 110 is also configured to move data from one of the storage arrays 105 to another one of the storage arrays 105, from one of the user devices 102 to another one of the user devices 102, between the user devices 102 and one or more storage arrays 105 or one or more cloud storage platforms 130 and between different locations (e.g., directories) within the same storage array 105 or within the same user device 102.

The archiving and restoration platform 110 is configured to move data, for example, by moving snapshots, data files or other data objects in and between the user devices 102, the storage arrays 105 and the cloud storage platforms 130. A given data object may comprise a single data file, or multiple data files. According to one or more embodiments, the archiving and restoration platform 110 permits administrators to automatically move data in and between the user devices 102, the storage arrays 105 and the cloud storage platforms 130 based on user-configured policies. The cloud storage platforms 130 include, for example, Dell® EMC® Elastic Cloud Storage (ECS), Microsoft® Azure®, Amazon® S3, and/or IBM® Cloud Object Storage (COS) platforms, or other available cloud infrastructures.

The archiving and restoration platform 110 in the present embodiment is assumed to be accessible to the user devices 102, and vice-versa, over the network 104. In addition, the archiving and restoration platform 110 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The archiving and restoration platform 110, on behalf of respective infrastructure tenants each corresponding to one or more users associated with respective ones of the user devices 102, provides a platform for archiving and restoring snapshots between storage arrays 105 and cloud storage platforms 130. Referring to FIG. 1, the archiving and restoration platform 110 comprises a snapshot archiving engine 111, a policy engine 113, a database 114 and a snapshot restoration engine 115. The snapshot archiving engine 111 comprises a caching component 112. The snapshot restoration engine 115 comprises a metadata retrieval component 116, a data retrieval component 117, a metadata comparing component 118 and a writing component 119.

The archiving and restoration platform 110 in some embodiments comprises configurable data mover modules adapted to interact with the user devices 102, the storage arrays 105 and the cloud storage platforms 130. At least one configuration file is implemented in or otherwise associated with the archiving and restoration platform 110. The state of the configuration file may be controlled at least in part by a job scheduler implemented as part of the archiving and restoration platform 110. The job scheduler interacts with the policy engine 113.

The archiving and restoration platform 110 can include at least one application programming interface (API) that permits an external component to control selection between various modes of operation. For example, the above-noted job scheduler can access the configuration file via such an API in order to control a mode of operation of the archiving and restoration platform 110. Additionally or alternatively, an application running on one or more of the user devices 102 can access the configuration file via the API in order to control the mode of operation of the archiving and restoration platform 110.

In some embodiments, the archiving and restoration platform 110 is configurable via the configuration file in a mode of operation in which a particular type of data movement in and between user devices 102, the storage arrays 105 and the cloud storage platforms 130 occurs for a given data object being utilized by an application running on one or more of the user devices 102. Furthermore, other embodiments can configure the archiving and restoration platform 110 in different modes of operation without the use of a configuration file. Thus, such a configuration file should not be viewed as a requirement.

The archiving and restoration platform 110 is illustratively coupled to the network 104 and configured to control transfer of data in and between the user devices 102, the storage arrays 105 and the cloud storage platforms 130. The term "data movement" as used in this and other contexts herein is intended to be broadly construed, so as to encompass data migration as well as other types of movement of data and relocation in and between the user devices 102, the storage arrays 105 and the cloud storage platforms 130. A given data mover module can be implemented at least in part on storage arrays 105 or other storage platforms that implement at least portions of one or more storage tiers of the multi-tier storage system.

In one or more embodiments, the archiving and restoration platform 110 can be used to tier file data and archive block data to the cloud storage platforms 130, and to recall file data and restore block data to the storage arrays 105 from the cloud storage platforms 130. In some embodiments, the archiving and restoration platform 110 can be used to migrate repositories between cloud storage platforms 130, storage arrays 105 and/or user devices 102.

In a file tiering process (also referred to herein as "cloud tiering") or file archiving process, the policy engine 113 is configured to identify files and/or snapshots that fit an administrator-defined criteria, and the archiving and restoration platform 110 initiates movement of the identified files and/or snapshots to a cloud storage platform 130. In an archiving process (e.g., block archiving process), the policy engine 113 identifies snapshots (e.g., block snapshots) that fit an administrator-defined criteria, and the archiving and restoration platform 110 initiates archiving of the identified snapshots to a cloud storage platform 130, leaving the identified snapshots in the storage arrays 105 or user devices 102. After the identified snapshots are backed up to one or more of the cloud storage platforms 130, the original snapshots can be erased from the storage arrays 105 or user devices 102 to free up space. As described in more detail herein, users may initiate restoring of one or more snapshots to one or more of the storage arrays 105 or user devices 102 via the snapshot restoration component 115.

During a process in which snapshots are tiered or archived to one or more cloud storage platforms 130, the snapshot archiving engine 111 reads data from one or more storage arrays 105 using a minimum data block size, such as, for example, about 8 kilobyte grain size (e.g. 8192 bytes). More specifically, the snapshot archiving engine 111 reads data corresponding to respective ones of a plurality of snapshots from one or more of the storage arrays 105, and compresses the data using the minimum data block size. In one or more embodiments, the snapshot archiving engine 111 also encrypts the data using the minimum data block size. The caching component 112 generates a cache data file for each snapshot, which stores in a cache the compressed and encrypted data using the minimum block size. The caching component 112 generates a cache metadata file that stores information in the cache about array offsets, array lengths, cloud offsets and/or cloud lengths corresponding to a snapshot. The compressed and encrypted data corresponding to respective ones of the plurality of snapshots are stored as a plurality of data files in the cache using the minimum data block size, and the respective metadata files for the respective ones of the plurality of snapshots are also stored in the cache. Once a cache threshold is reached (e.g., storage limit) the data and metadata files are transmitted to a cloud storage platform 130. This process continues until the end of data from the snapdiff is reached. Subsequent delta snapshots are also transmitted to the cloud storage platforms 130 using the cache data and cache metadata files using the above-described process.

Referring to FIG. 5, an example metadata file 500 includes, for a given snapshot, array offsets, array lengths, cloud offsets, cloud lengths, compression types, and indications of whether encryption has been enabled. For example, in the first row of the metadata file 500, for a portion of a snapshot, an offset on the array is 0, a length in the array is 8192 bytes, an offset in cloud storage is M #305179, a length in cloud storage is 509 bytes, a compression type is z1, and encryption has not been enabled. Similarly, other rows of the metadata file 500 provide the same information for other portions of the snapshot.

According to an embodiment, in file tiering, file archiving and block processes, the policy engine 113 scans, for example, files and/or snapshots and applies policy rules to each file and/or snapshot. If there are multiple rules in a policy, the policy engine 113 applies the rules to a given file and/or snapshot until a rule evaluates to "true," and then takes the action associated with the rule, such as, for example, "archive" or "don't archive." Some examples of rules governing whether files and/or blocks are archived may be based on or more constraints such as, for example, when a file and/or snapshot was last accessed or modified, when file or snapshot attributes were last changed, and/or a size of a file or snapshot (e.g., >10 MB). Rules may also be based on file or snapshot names (e.g., only archive files or snapshots having certain names or parts of names) and/or directory name (e.g., only archive files or snapshots from specified directories or from directories having certain names or parts of names).

As noted herein, when restoring of a particular snapshot (e.g., snap_n, where n is an integer) is initiated, the snapshot restoration engine 115 of the archiving and restoration platform 110 commences restoration starting with the snapshot which is being restored, and going in reverse chronological order to the base snapshot (i.e., snap_n, . . . , snap_2, snap_1, snap base). The metadata retrieval component 116 downloads a metadata file corresponding to snap_n. The data retrieval component 117 downloads the data file corresponding to snap_n, and restores all the data for snap_n from one of the cloud storage platforms 130 to one of the storage arrays 105. The metadata for snap_n is designated as master metadata. Then the metadata retrieval component 116 will download the metadata file corresponding to snap_n−1 and instead of restoring all data for snap_n−1 from cloud storage to the storage array, the metadata comparing component 118 compares snap_n−1 metadata with the master metadata. Based on the comparison, if an offset found in the snap_n−1 metadata already exists in the master metadata, the snapshot restoration engine 115 will determine that there is no need to write the data pertaining to that offset again from cloud storage to the storage array, and that offset is dropped. If an offset found in the snap_n−1 metadata does not exist in the master metadata, the data retrieval component 117 downloads the data pertaining to that offset from the cloud storage platform 130, and the writing component 119 writes the data pertaining to that offset to the storage array 105. In addition, the writing component 119 appends the offset that did not exist in the master metadata to the master metadata.

For example, referring to table 205, snapshots S1, S2 and S3 are stored on one of the storage arrays 105. The snapshot S1 includes data blocks A, B and Z, which may each be, for example, about 8 kilobytes. Snapshot S2, which comes after snapshot S1 in time, modifies data block B to B", and further includes data blocks C, D and E. Snapshot S3, which comes after snapshots S1 and S2 in time, modifies data block E to E" and data block Z to Z", and further includes data block F. Referring to table 210, one of the cloud storage platforms 130 includes objects O1, O2 and O3 respectively corresponding to snapshots S1, S2 and S3. The blocks B, E and Z, which are modified in subsequent snapshots are shown in darker shades than the blocks A, B", C, D, E", F and Z", which are not modified in subsequent snapshots. Based on the changes made by each subsequent snapshot, the differential snapshot ("cloud snapdiff") drops the data blocks that have been modified in subsequent snapshots (B, E and Z) and illustrates the final remaining data blocks after the last snapshot, and the object from which they are derived (O1:A, O2:B", O2:C, O2:D, O3:E", O3:F and O3:Z". Similarly, FIG. 3 depicts a relationship 300 of the remaining storage blocks A, B", C, D, E", F and Z", in a differential snapshot corresponding to a plurality of snapshots S1, S2 and S3 according to an illustrative embodiment.

Figure 2:
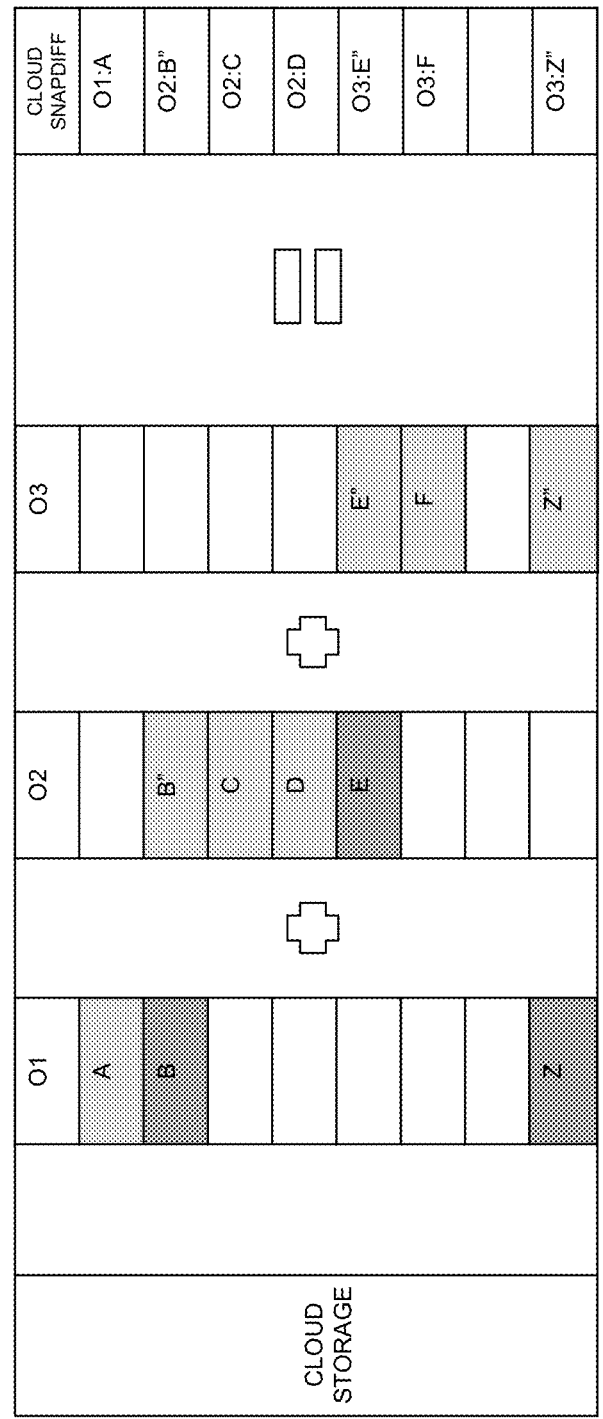
FIG. 2 depicts details of cloud and array storage in connection with restoring a snapshot from a cloud storage platform using the differential cloud snapshot mechanism according to an illustrative embodiment.
Figure 3:
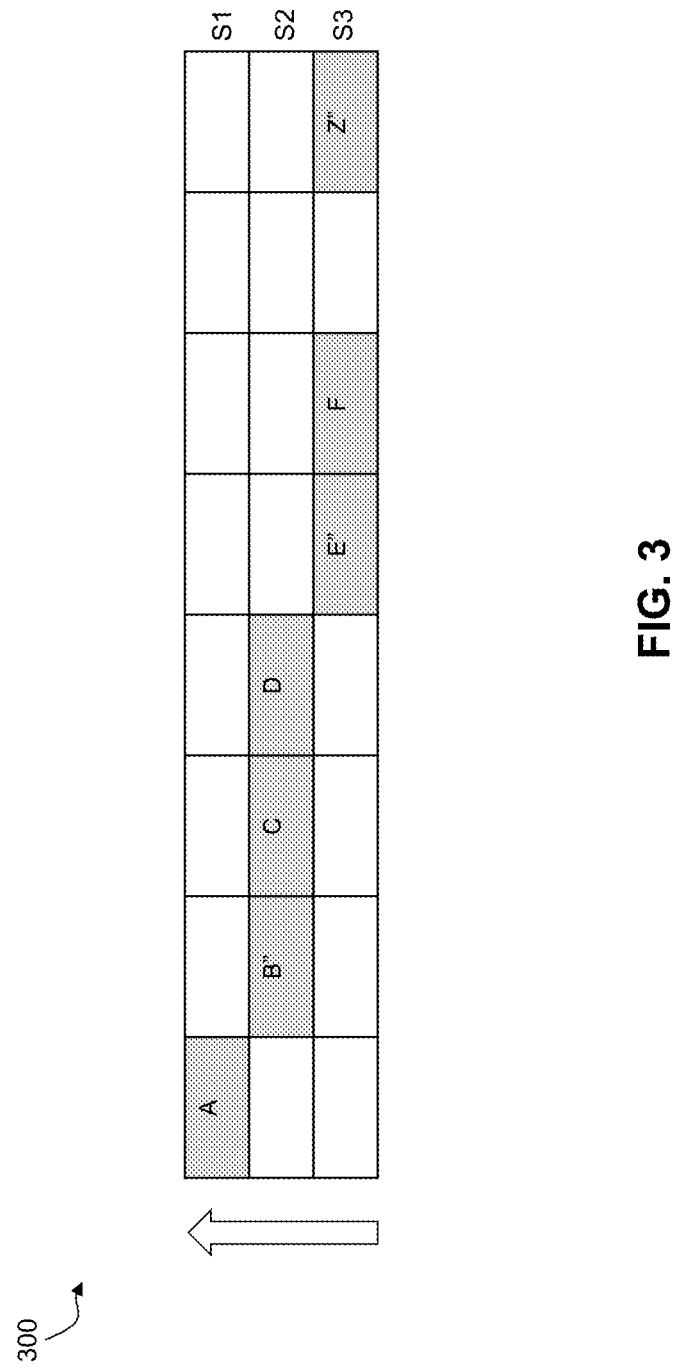
FIG. 3 depicts details of storage blocks of a differential snapshot corresponding to a plurality of snapshots according to an illustrative embodiment.

Referring to FIGS. 2 and 3, in an operational example, assuming S3 is snap_n, the metadata retrieval component 116 downloads a metadata file corresponding to S3. The data retrieval component 117 downloads the data file corresponding to S3, and restores all the data for S3 from one of the cloud storage platforms 130 to one of the storage arrays 105. The metadata for S3, including the offsets for blocks E", F and Z", is designated as master metadata. Then the metadata retrieval component 116 downloads the metadata file corresponding to S2 (snap_n−1) and instead of restoring all data for S2 from cloud storage to the storage array, the metadata comparing component 118 compares S2 metadata with the master metadata. Based on the comparison, the metadata comparing component 118 determines that the offset for block E in snapshot S2 already exists in the master metadata, so the snapshot restoration engine 115 determines that there is no need to write the block E data pertaining to that offset from cloud storage to the storage array, and that offset is dropped. As can be understood, this methodology prevents writing of data blocks that have been modified by a subsequent snapshot. On the other hand, if one or more offsets found in the S2 metadata do not exist in the master metadata (e.g., offsets for data blocks B", C and D), the data retrieval component 117 downloads the data pertaining to those offsets from the cloud storage platform 130, and the writing component 119 writes the data pertaining to those offsets to the storage array 105. In addition, the writing component 119 appends the offsets from S2 that did not exist in the master metadata to the master metadata. As noted herein, the process is performed recursively until a base snapshot is reached. Accordingly, the same process is then repeated for S1, which is in this case, is the base snapshot. More specifically, the metadata retrieval component 116 downloads the metadata file corresponding to S1 (snap_n−2) and instead of restoring all data for S1 from cloud storage to the storage array, the metadata comparing component 118 compares S1 metadata with the master metadata. Based on the comparison, the metadata comparing component 118 determines that the offsets for blocks B and Z in snapshot S1 already exist in the master metadata, so the snapshot restoration engine 115 determines that there is no need to write the block B and Z data pertaining to those offsets from cloud storage to the storage array, and those offsets are dropped. On the other hand, if one or more offsets found in the S1 metadata do not exist in the master metadata (e.g., offset for data block A), the data retrieval component 117 downloads the data pertaining to those offsets from the cloud storage platform 130, and the writing component 119 writes the data pertaining to those offsets to the storage array 105. In addition, the writing component 119 appends the offsets from S1 that did not exist in the master metadata to the master metadata. The arrow in FIG. 3 illustrates the direction of snapshot analysis (i.e., starting with snap_n and ending with the base snapshot).

The downloaded metadata files for each snapshot, and the downloaded data pertaining to snap_n, as well as the downloaded data corresponding to the offsets that did not exist in the master metadata from the snapshots previous to snap_n, can be stored in database 114. According to one or more embodiments, the database 114 used herein can be configured according to a relational database management system (RDBMS) (e.g., PostgreSQL). The database 114 in some embodiments is implemented using one or more storage systems or devices associated with the archiving and restoration platform 110. In some embodiments, one or more of the storage systems utilized to implement the databases comprise a scale-out all-flash content addressable storage array or other type of storage array. Similarly, the storage arrays 105 described herein may comprise scale-out all-flash content addressable storage arrays or other type of storage arrays.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the archiving and restoration platform 110, the snapshot archiving engine 111, the policy engine 113, the database 114 and the snapshot restoration engine 115 in other embodiments can be implemented at least in part externally to the archiving and restoration platform 110, for example, as stand-alone servers, sets of servers or other types of systems coupled to the network 104. For example, the snapshot archiving engine 111, the policy engine 113, the database 114 and the snapshot restoration engine 115 may be provided as cloud services accessible by the archiving and restoration platform 110.

The snapshot archiving engine 111, the policy engine 113, the database 114 and the snapshot restoration engine 115 in the FIG. 1 embodiment are each assumed to be implemented using at least one processing device. Each such processing device generally comprises at least one processor and an associated memory, and implements one or more functional modules for controlling certain features of the snapshot archiving engine 111, the policy engine 113, the database 114 and/or the snapshot restoration engine 115.

At least portions of the archiving and restoration platform 110 and the components thereof may be implemented at least in part in the form of software that is stored in memory and executed by a processor. The archiving and restoration platform 110 and the components thereof comprise further hardware and software required for running the archiving and restoration platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the snapshot archiving engine 111, the policy engine 113, the database 114, the snapshot restoration engine 115 and other components of the archiving and restoration platform 110 in the present embodiment are shown as part of the archiving and restoration platform 110, at least a portion of the snapshot archiving engine 111, the policy engine 113, the database 114, the snapshot restoration engine 115 and other components of the archiving and restoration platform 110 in other embodiments may be implemented on one or more other processing platforms that are accessible to the archiving and restoration platform 110 over one or more networks. Such components can each be implemented at least in part within another system element or at least in part utilizing one or more stand-alone components coupled to the network 104.

It is assumed that the archiving and restoration platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the snapshot archiving engine 111, the policy engine 113, the database 114, the snapshot restoration engine 115 and other components of the archiving and restoration platform 110, and the elements thereof can each be implemented in the form of one or more LXCs running on one or more VMs. Other arrangements of one or more processing devices of a processing platform can be used to implement the snapshot archiving engine 111, the policy engine 113, the database 114 and the snapshot restoration engine 115 as well as other components of the archiving and restoration platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the archiving and restoration platform 110 to reside in different data centers. Numerous other distributed implementations of the archiving and restoration platform 110 are possible.

Accordingly, one or each of the snapshot archiving engine 111, the policy engine 113, the database 114, the snapshot restoration engine 115 and other components of the archiving and restoration platform 110 can each be implemented in a distributed manner so as to comprise a plurality of distributed components implemented on respective ones of a plurality of compute nodes of the archiving and restoration platform 110.

It is to be appreciated that these and other features of illustrative embodiments are presented by way of example only, and should not be construed as limiting in any way.

Accordingly, different numbers, types and arrangements of system components such as the snapshot archiving engine 111, the policy engine 113, the database 114, the snapshot restoration engine 115 and other components of the archiving and restoration platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the archiving and restoration platform can be offered to cloud infrastructure customers or other users as part of FaaS, CaaS and/or PaaS offerings.

Figure 6:
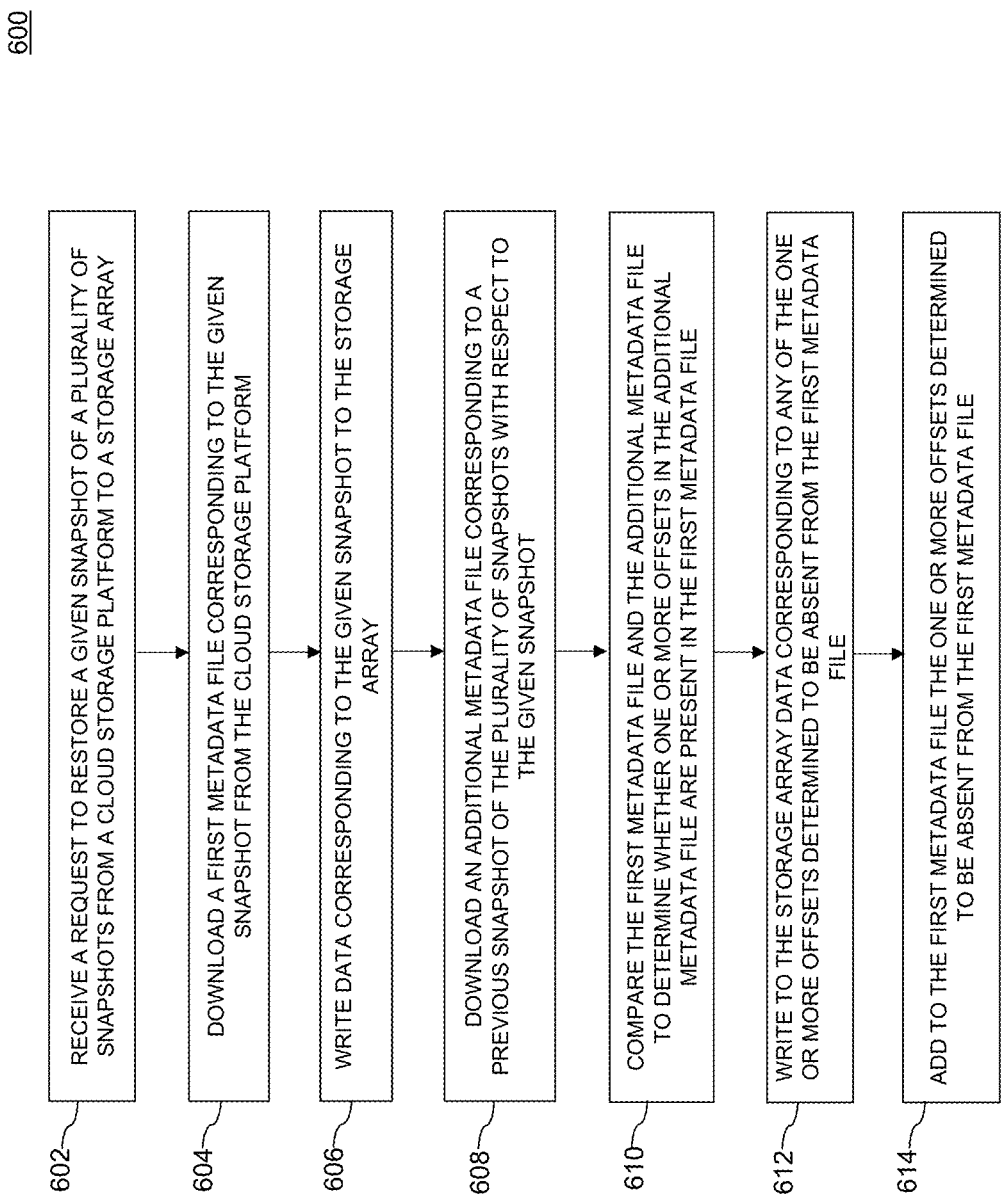
FIG. 6 depicts a process for archiving and restoring snapshots between array and cloud storage according to an illustrative embodiment.

The operation of the information processing system 100 will now be described in further detail with reference to the flow diagram of FIG. 6. With reference to FIG. 6, a process 600 for archiving and restoring snapshots between array and cloud storage as shown includes steps 602 through 614, and is suitable for use in the system 100 but is more generally applicable to other types of information processing systems comprising an archiving and restoration platform configured for archiving and restoring snapshots between array and cloud storage.

In step 602, a request to restore a given snapshot of a plurality of snapshots from a cloud storage platform to a storage array is received. In step 604, a first metadata file corresponding to the given snapshot is downloaded from the cloud storage platform, and in step 606, data corresponding to the given snapshot is written to the storage array. In step 608, an additional metadata file is downloaded. The additional metadata file corresponds to a previous snapshot of the plurality of snapshots with respect to the given snapshot.

In step 610, the first metadata file and the additional metadata file are compared to determine whether one or more offsets in the additional metadata file are present in the first metadata file. In step 612, data corresponding to any of the one or more offsets determined to be absent from the first metadata file is written to the storage array. Any of the one or more offsets determined to be present in the first metadata file are ignored. Data corresponding to the one or more offsets determined to be present in the first metadata file is prevented from being written to the storage array. In step 614, the one or more offsets determined to be absent from the first metadata file are added to the first metadata file. The steps of the process 600 can be performed by a CTA.

The method is repeated for previous snapshots with respect to the given snapshot until a base snapshot is reached. More specifically, respective additional metadata files corresponding to respective previous snapshots of the plurality of snapshots with respect to the given snapshot and to the previous snapshot are recursively downloaded. In addition, the first metadata file and the respective additional metadata files are recursively compared to determine whether one or more offsets in the respective additional metadata files are present in the first metadata file. Data corresponding to any of the one or more offsets in the respective additional metadata files determined to be absent from the first metadata file is recursively written to the storage array, the one or more offsets in the respective additional metadata files determined to be absent from the first metadata file are recursively added to the first metadata file. The downloading of the respective additional metadata files, the comparing of the first metadata file and the respective additional metadata files, the writing of the data corresponding to the one or more offsets in the respective additional metadata files and the adding of the one or more offsets in the respective additional metadata files are recursively performed until a base snapshot is reached.

According to one or more embodiments, the process includes sending the plurality of snapshots to the cloud storage platform for storage on the cloud storage platform. Sending the plurality of snapshots to the cloud storage platform for storage comprises reading data corresponding to respective ones of the plurality of snapshots from the storage array, and compressing the data using a minimum data block size. The data corresponding to the respective ones of the plurality of snapshots from the storage array can also be encrypted using the minimum data block size. The minimum data block size is about 8 kilobytes.

Sending the plurality of snapshots to the cloud storage platform for storage also comprises storing the compressed data corresponding to respective ones of the plurality of snapshots as a plurality of data files in a cache using the minimum data block size, and generating respective metadata files for the respective ones of the plurality of snapshots, wherein the respective metadata files comprise information about array and cloud offsets for the respective ones of the plurality of snapshots. The plurality of data files and the respective metadata files are sent to the cloud storage platform once a cache storage threshold is reached.

It is to be appreciated that the FIG. 6 process and other features and functionality described above can be adapted for use with other types of information systems configured to execute archiving and restoration services in an archiving and restoration platform or other type of platform.

The particular processing operations and other system functionality described in conjunction with the flow diagram of FIG. 6 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an archiving and restoration platform as disclosed herein can provide a number of significant advantages relative to conventional arrangements. For example, unlike conventional techniques, the embodiments advantageously restore snapshots in reverse chronological order so that writing of data blocks that have been modified by a subsequent snapshot is avoided. As a result, snapshot restore time is reduced and a reduced amount of data is written to storage arrays. In addition, because metadata files are being compared for the presence/absence of offsets before data read from the cloud, less data is read from the cloud storage platforms. Accordingly, by sending fewer read requests to the cloud, and writing reduced amounts of data to storage arrays, the embodiments are more efficient and use less processing and storage resources.

In contrast, conventional techniques restore snapshots from a first snapshot to a last snapshot, requiring large amounts of time and computing and storage resources. For example, conventional approaches require handling of large volumes of read and write operations for data that is ultimately not needed since it is subject to modification by subsequent snapshots.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the archiving and restoration platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an archiving and restoration platform in illustrative embodiments. These and other cloud-based systems in illustrative embodiments can include object stores.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
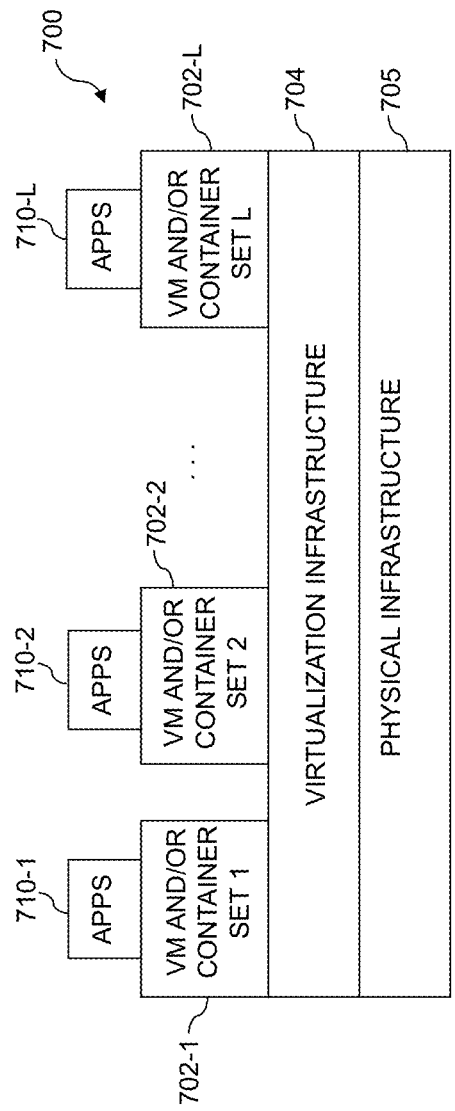
FIGS. 7 and 8 show examples of processing platforms that may be utilized to implement at least a portion of an information processing system according to illustrative embodiments.
Figure 8:
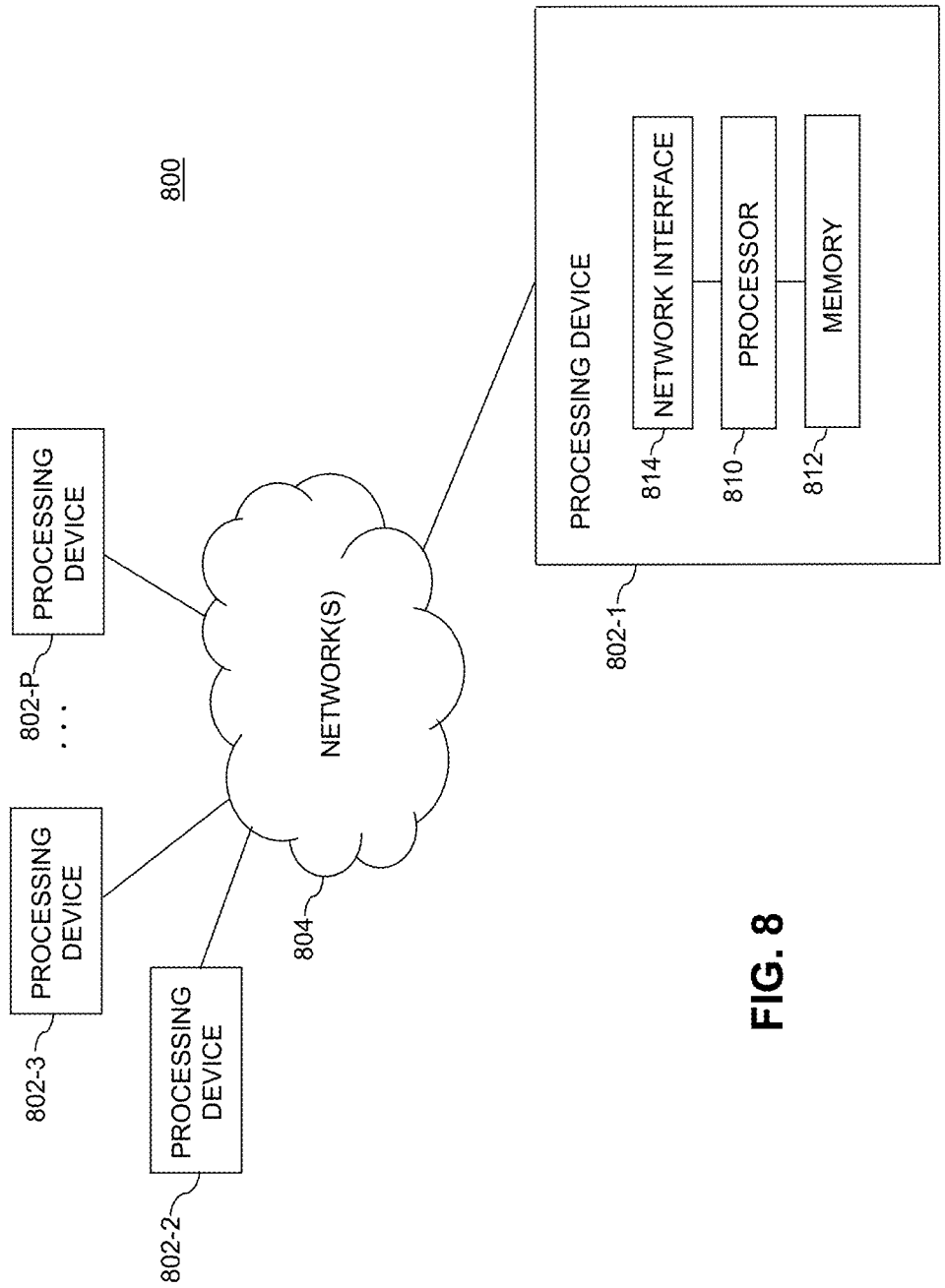

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-P, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the archiving and restoration platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and archiving and restoration platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured:
   to receive a request to restore a given snapshot of a plurality of snapshots from a cloud storage platform to a storage array;
   to download a first metadata file corresponding to the given snapshot from the cloud storage platform;
   to write data corresponding to the given snapshot to the storage array;
   to download an additional metadata file corresponding to a previous snapshot of the plurality of snapshots with respect to the given snapshot;
   to compare the first metadata file and the additional metadata file to determine whether one or more offsets in the additional metadata file are present in the first metadata file;
   to write to the storage array data corresponding to any of the one or more offsets determined to be absent from the first metadata file; and
   to add to the first metadata file the one or more offsets determined to be absent from the first metadata file;
   wherein said at least one processing platform is further configured to send the plurality of snapshots to the cloud storage platform for storage on the cloud storage platform; and
   wherein, in sending the plurality of snapshots to the cloud storage platform for storage, said at least one processing platform is configured:
   to read data corresponding to respective ones of the plurality of snapshots from the storage array; and to compress the data corresponding to the respective ones of the plurality of snapshots using a minimum data block size.

2. The apparatus of claim 1 wherein said at least one processing platform is further configured:
to recursively download respective additional metadata files corresponding to respective previous snapshots of the plurality of snapshots with respect to the given snapshot and to the previous snapshot; and
to recursively compare the first metadata file and the respective additional metadata files to determine whether one or more offsets in the respective additional metadata files are present in the first metadata file.

3. The apparatus of claim 2 wherein said at least one processing platform is further configured:
to recursively write to the storage array data corresponding to any of the one or more offsets in the respective additional metadata files determined to be absent from the first metadata file; and
to recursively add to the first metadata file the one or more offsets in the respective additional metadata files determined to be absent from the first metadata file.

4. The apparatus of claim 3 wherein said at least one processing platform is further configured to recursively perform the downloading of the respective additional metadata files, the comparing of the first metadata file and the respective additional metadata files, the writing of the data corresponding to the one or more offsets in the respective additional metadata files and the adding of the one or more offsets in the respective additional metadata files until a base snapshot is reached.

5. The apparatus of claim 1 wherein said at least one processing platform is further configured to ignore any of the one or more offsets determined to be present in the first metadata file.

6. The apparatus of claim 5 wherein said at least one processing platform is further configured to prevent writing to the storage array data corresponding to the one or more offsets determined to be present in the first metadata file.

7. The apparatus of claim 1 wherein, in sending the plurality of snapshots to the cloud storage platform for storage, said at least one processing platform is further configured to encrypt the data corresponding to the respective ones of the plurality of snapshots using the minimum data block size.

8. The apparatus of claim 1, wherein the minimum data block size is about 8 kilobytes.

9. The apparatus of claim 1, wherein, in sending the plurality of snapshots to the cloud storage platform for storage, said at least one processing platform is further configured:
to store the compressed data corresponding to respective ones of the plurality of snapshots as a plurality of data files in a cache using the minimum data block size; and
to send the plurality of data files to the cloud storage platform once a cache storage threshold is reached.

10. The apparatus of claim 9 wherein, in sending the plurality of snapshots to the cloud storage platform for storage, said at least one processing platform is further configured:
to generate respective metadata files for the respective ones of the plurality of snapshots;
wherein the respective metadata files comprise information about array and cloud offsets for the respective ones of the plurality of snapshots.

11. The apparatus of claim 10 wherein, in sending the plurality of snapshots to the cloud storage platform for storage, said at least one processing platform is further configured to send the respective metadata files to the cloud storage platform once the cache storage threshold is reached.

12. The apparatus of claim 1 wherein said at least one processing platform comprises a cloud tiering appliance.

13. A method comprising:
receiving a request to restore a given snapshot of a plurality of snapshots from a cloud storage platform to a storage array;
downloading a first metadata file corresponding to the given snapshot from the cloud storage platform;
writing data corresponding to the given snapshot to the storage array;
downloading an additional metadata file corresponding to a previous snapshot of the plurality of snapshots with respect to the given snapshot;
comparing the first metadata file and the additional metadata file to determine whether one or more offsets in the additional metadata file are present in the first metadata file;
writing to the storage array data corresponding to any of the one or more offsets determined to be absent from the first metadata file; and
adding to the first metadata file the one or more offsets determined to be absent from the first metadata file;
the method further comprising:
sending the plurality of snapshots to the cloud storage platform for storage on the cloud storage platform;
wherein sending the plurality of snapshots to the cloud storage platform for storage comprises:
reading data corresponding to respective ones of the plurality of snapshots from the storage array; and
compressing the data corresponding to the respective ones of the plurality of snapshots using a minimum data block size;
wherein the method is performed by at least one processing platform comprising at least one processing device comprising a processor coupled to a memory.

14. The method of claim 13 further comprising:
recursively downloading respective additional metadata files corresponding to respective previous snapshots of the plurality of snapshots with respect to the given snapshot and to the previous snapshot; and
recursively comparing the first metadata file and the respective additional metadata files to determine whether one or more offsets in the respective additional metadata files are present in the first metadata file.

15. The method of claim 14 further comprising:
recursively writing to the storage array data corresponding to any of the one or more offsets in the respective additional metadata files determined to be absent from the first metadata file; and
recursively adding to the first metadata file the one or more offsets in the respective additional metadata files determined to be absent from the first metadata file.

16. A computer program product comprising a non-transitory processor-readable storage medium having stored therein program code of one or more software programs, wherein the program code when executed by at least one processing platform causes said at least one processing platform:
to receive a request to restore a given snapshot of a plurality of snapshots from a cloud storage platform to a storage array;
to download a first metadata file corresponding to the given snapshot from the cloud storage platform;

to write data corresponding to the given snapshot to the storage array;

to download an additional metadata file corresponding to a previous snapshot of the plurality of snapshots with respect to the given snapshot;

to compare the first metadata file and the additional metadata file to determine whether one or more offsets in the additional metadata file are present in the first metadata file;

to write to the storage array data corresponding to any of the one or more offsets determined to be absent from the first metadata file; and to add to the first metadata file the one or more offsets determined to be absent from the first metadata file;

wherein the program code when executed by said at least one processing platform further causes said at least one processing platform to send the plurality of snapshots to the cloud storage platform for storage on the cloud storage platform; and wherein, in sending the plurality of snapshots to the cloud storage platform for storage, said at least one processing platform is configured:

to read data corresponding to respective ones of the plurality of snapshots from the storage array; and to compress the data corresponding to the respective ones of the plurality of snapshots using a minimum data block size.

17. The computer program product according to claim 16 wherein the program code further causes said at least one processing platform:

to recursively download respective additional metadata files corresponding to respective previous snapshots of the plurality of snapshots with respect to the given snapshot and to the previous snapshot; and to recursively compare the first metadata file and the respective additional metadata files to determine whether one or more offsets in the respective additional metadata files are present in the first metadata file.

18. The computer program product according to claim 17 wherein the program code further causes said at least one processing platform:

to recursively write to the storage array data corresponding to any of the one or more offsets in the respective additional metadata files determined to be absent from the first metadata file; and to recursively add to the first metadata file the one or more offsets in the respective additional metadata files determined to be absent from the first metadata file.

19. The computer program product according to claim 16 wherein, in sending the plurality of snapshots to the cloud storage platform for storage, said at least one processing platform is further configured to encrypt the data corresponding to the respective ones of the plurality of snapshots using the minimum data block size.

20. The computer program product according to claim 16 wherein, in sending the plurality of snapshots to the cloud storage platform for storage, said at least one processing platform is further configured:

to store the compressed data corresponding to respective ones of the plurality of snapshots as a plurality of data files in a cache using the minimum data block size; and to send the plurality of data files to the cloud storage platform once a cache storage threshold is reached.

* * * * *